US007801167B2

United States Patent
Yin et al.

(10) Patent No.: US 7,801,167 B2
(45) Date of Patent: Sep. 21, 2010

(54) ENHANCED POWER SAVING METHODS AND SYSTEMS FOR POWERLINE NETWORK

(75) Inventors: Zhanping Yin, Vancouver, WA (US); Daniel J. Park, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 99 days.

(21) Appl. No.: 12/315,458

(22) Filed: Dec. 3, 2008

(65) Prior Publication Data

US 2010/0135318 A1    Jun. 3, 2010

(51) Int. Cl.
*H04L 12/413* (2006.01)
(52) U.S. Cl. .................. 370/445; 370/447; 370/462; 370/461
(58) Field of Classification Search .................. None
See application file for complete search history.

(56) References Cited

U.S. PATENT DOCUMENTS

| 6,671,284 B1 * | 12/2003 | Yonge et al. ............ 370/462 |
|---|---|---|
| 6,907,044 B1 * | 6/2005 | Yonge et al. ............ 370/445 |
| 6,909,723 B1 | 6/2005 | Yonge, III et al. ........ 370/447 |
| 6,954,890 B2 | 10/2005 | Gaskill et al. ............ 714/749 |
| 2004/0136396 A1 | 7/2004 | Yonge, III et al. ........ 370/445 |
| 2005/0169296 A1 * | 8/2005 | Katar et al. .............. 370/445 |
| 2006/0198387 A1 | 9/2006 | Yonge, III et al. ........ 370/437 |
| 2006/0218419 A1 * | 9/2006 | Iwamura et al. .......... 713/300 |
| 2006/0245355 A1 * | 11/2006 | Iwamura .................. 370/232 |

OTHER PUBLICATIONS

Homeplug Powerline Alliance, Inc., "HomePlug AV White Paper" <http://www.homeplug.org/products/whitepapers/HPAV-White-Paper_050818.pdf> 2005, 11 pages.

* cited by examiner

*Primary Examiner*—Chi H Pham
*Assistant Examiner*—Kouroush Mohebbi
(74) *Attorney, Agent, or Firm*—Scot A. Reader

(57) ABSTRACT

Enhanced power saving methods and systems for a powerline network improve power conservation by adaptively regulating the monitoring of a shared carrier sense multiple access (CSMA) region of a beacon period based on current need. The methods and systems include one or more enhanced power saving modes (EPSM). In some embodiments, EPSM include one or both of an enhanced priority resolution (EPR) mode and an enhanced idle sensing (EIS) mode. In some embodiments, an EPSM is selected from a plurality of EPSM in response to an EPSM indicator detected in a beacon region of the beacon period.

18 Claims, 7 Drawing Sheets

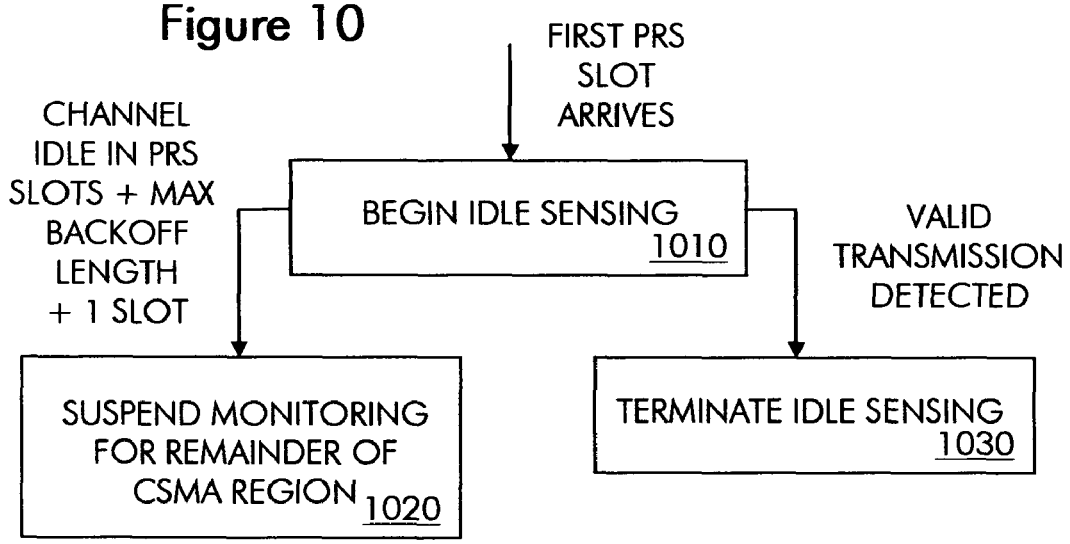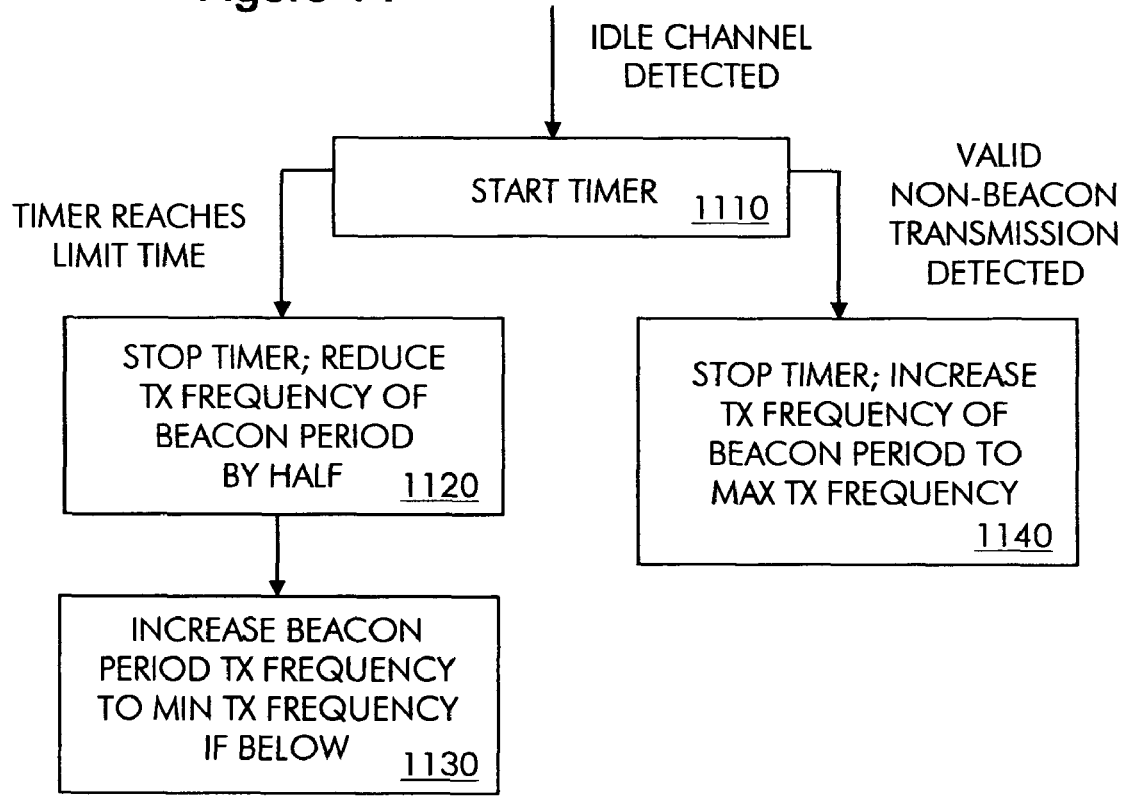

ENHANCED POWER SAVING METHODS AND SYSTEMS FOR POWERLINE NETWORK

BACKGROUND OF THE INVENTION

The present invention relates to powerline networking and, more particularly, to enhanced power saving methods and systems for a powerline network.

Powerline networks provide entertainment-oriented networking by supporting communication of video, audio and data content over alternating current (AC) wiring within dwelling units. One industry document that governs powerline networks is the HomePlug AV (HPAV) specification. An HPAV network operates on a single physical channel and may include one or more audiovisual logical networks (AVLN). Each AVLN has one or more nodes and is managed by a central coordinator (CCo) entity that is active on a managing one of the nodes. Each AVLN is assigned a different network membership key (NMK) that enables nodes within the AVLN to encrypt and decrypt information transmitted within the AVLN and prevents nodes outside the AVLN from snooping such information.

Communication in an HPAV network is achieved by transmitting and receiving information on the channel in successive beacon periods. The beacon periods are synchronized to the AC line cycle, with each beacon period traversing two cycles. Turning to FIG. 1, within an exemplary beacon period 100 there is a beacon region 110, a shared carrier sense multiple access (CSMA) region 120 and a reserved region 130. The managing node of an AVLN advertises control information, such as a transmission schedule, to the nodes in its AVLN in a beacon slot 140 within beacon region 110. Beacon region 110 is followed by shared CSMA region 120 in which nodes in all AVLN may attempt contention-based communication on a priority or "best effort" basis. Shared CSMA region 120 is followed by reserved region 130 in which nodes that have been allocated time slots by a managing node may engage in contention-free communication. In some implementations, the beacon period does not include a reserved region.

In known HPAV networks, all nodes monitor the channel in the shared CSMA region of each beacon period. However, if there are no packets to transmit, having all nodes monitor in the shared CSMA region can waste power. The amount of wasted power can be considerable when the HPAV network is idle for a long time, such as in the late evening hours when the users of the network are typically asleep. To improve power conservation, the HPAV specification defines a basic power saving mode called network power saving mode (NPSM). In NPSM, if a managing node of an AVLN does not detect a valid transmission on the channel for at least 30 seconds, the managing node sets an NPSM bit in the next beacon slot for the AVLN and announces a schedule consisting only of the beacon region, a shared CSMA region of minimum length (e.g. 1500 milliseconds) and a reserved region of sufficient size to support discover and proxy beacons. The managing node designates the rest of the beacon period a stayout region which nodes in the AVLN do not monitor, allowing them to enter a power conserving "sleep" mode. Turning to FIG. 2, for example, while NPSM is active, after transmission of a beacon 210 and an interframe space a shared CSMA region 200 begins in which nodes monitor the channel and may indicate that they have a packet to transmit by sending one or more priority resolution symbols (PRS) in priority resolution symbol slots (PRS0 SLOT, PRS1 SLOT) 220, 230. If the nodes do not detect a valid transmission within a minimum shared CSMA region (MIN CSMA REGION) that includes PRS slots 220, 230 and an additional window 240, the nodes suspend monitoring of shared CSMA region 200. On the other hand, if a valid transmission is detected within the minimum shared CSMA region, NSPM terminates and the nodes monitor the entire shared CSMA region 200, even after all packets have been transmitted.

Unfortunately, NSPM is not very energy efficient. In NSPM, at least a 30-second idle period passes before the managing node sets the NSPM bit. Still more time passes before the minimum shared CSMA region passes without a valid transmission and the nodes suspend monitoring. And if a valid transmission is detected within the minimum shared CSMA region, NPSM terminates and the nodes monitor the entire shared CSMA region even after there are no more packets to transmit.

SUMMARY OF THE INVENTION

The present invention, in a basic feature, provides enhanced power saving methods and systems for a powerline network. The methods and systems improve power conservation by adaptively regulating the monitoring of a shared CSMA region of a beacon period based on current need. The methods and systems include one or more enhanced power saving modes (EPSM). In some embodiments, EPSM include one or both of an enhanced priority resolution (EPR) mode and an enhanced idle sensing (EIS) mode. In some embodiments, an EPSM is selected from a plurality of EPSM in response to an EPSM indicator detected in a beacon region of the beacon period.

In one aspect of the invention, an enhanced power saving method for a powerline network comprises the steps of detecting an EPSM indicator in a beacon region of a beacon period and selecting an EPSM from among a plurality of EPSM based on the EPSM indicator, wherein the plurality of EPSM comprise an EPR mode and an EIS mode.

In some embodiments, the EPR mode is selected, a packet presence symbol (PPS) slot in a shared CSMA region of the beacon period is monitored in response to a failure to detect a PRS in any of a plurality of monitored PRS slots in the shared CSMA region, and monitoring in the shared CSMA region after the PPS slot is conditioned on whether a PPS is detected in the PPS slot.

In some embodiments, the EIS mode is selected, a predetermined window starting with a PRS slot and ending after a maximum contention backoff length in a shared CSMA region is monitored for a valid transmission, and monitoring in the shared CSMA region after the predetermined window is conditioned on whether a valid transmission is detected.

In some embodiments, detecting the EPSM indicator comprises detecting an EPR mode bit in a beacon payload.

In some embodiments, detecting the EPSM indicator comprises detecting an EIS mode bit in a beacon payload.

In another aspect of the invention, an enhanced power saving method for a powerline network comprises the steps of monitoring a plurality of PRS slots in a shared CSMA region of a beacon period, monitoring a PPS slot in the shared CSMA region in response to a failure to detect a PRS in any of the plurality of PRS slots and conditioning monitoring in the shared CSMA region after the PPS slot on whether a PPS is detected in the PPS slot.

In some embodiments, the conditioning monitoring step comprises continuing monitoring in response to detecting a PPS in the PPS slot.

In some embodiments, the conditioning monitoring step comprises suspending monitoring in response to a failure to detect a PPS in the PPS slot.

In yet another aspect of the invention, an enhanced power saving method for a powerline network comprises the steps of monitoring for a valid transmission a predetermined window starting with a PRS slot and ending after a maximum contention backoff length in a shared CSMA region of a beacon period and conditioning monitoring in the shared CSMA region after the predetermined window on whether a valid transmission is detected.

In some embodiments, the conditioning monitoring step comprises continuing monitoring in response to detecting a valid transmission.

In some embodiments, the conditioning monitoring step comprises suspending monitoring in response to a failure to detect a valid transmission.

In some embodiments, the predetermined window ends one slot after the maximum contention backoff length.

In some embodiments, the methods are performed by a managed node of a HPAV network.

In some embodiments, the methods further comprise the steps of detecting a reduction in a beacon period transmission frequency, wherein the beacon period transmission frequency is reduced in response to a failure to detect a valid non-beacon transmission within a limit time.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 10 shows an EIS enhanced power saving method performed by a managed node in some embodiments of the invention.

FIG. 11 shows a method performed by a managing node to dynamically adapt a beacon period in some embodiments of the invention.

DETAILED DESCRIPTION OF A PREFERRED EMBODIMENT

Figure 1:
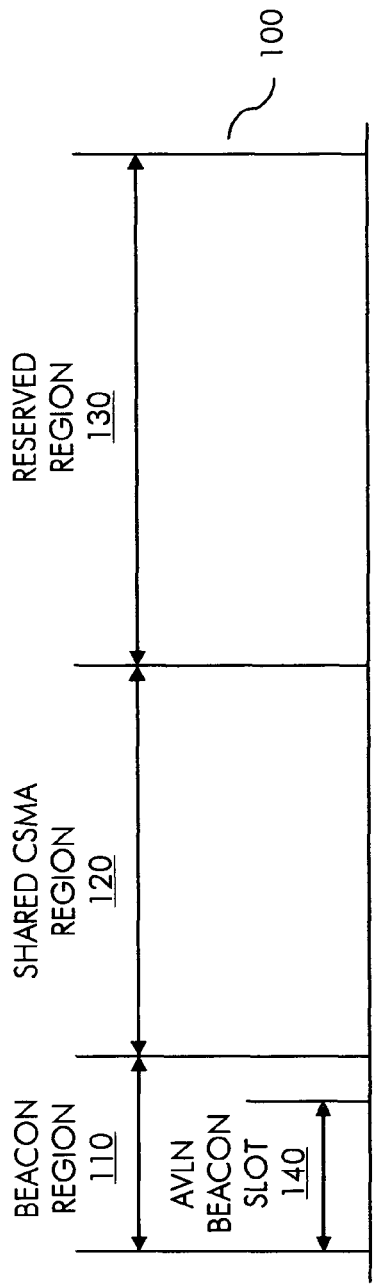
FIG. 1 shows a beacon period of a known HPAV network.
Figure 2:
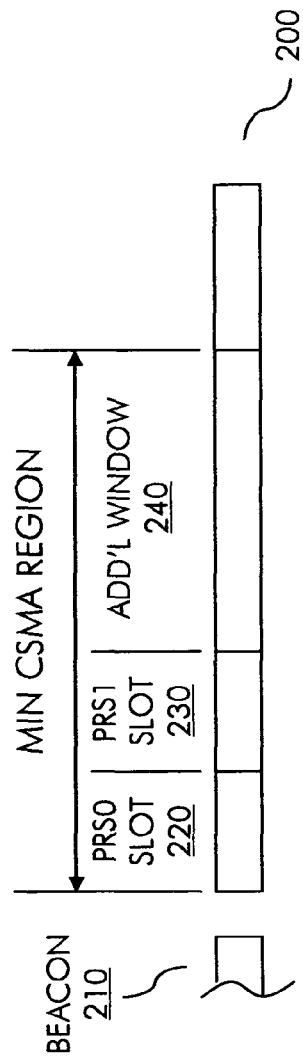
FIG. 2 shows a shared CSMA region of a known HPAV network in which NPSM is active.
Figure 3:
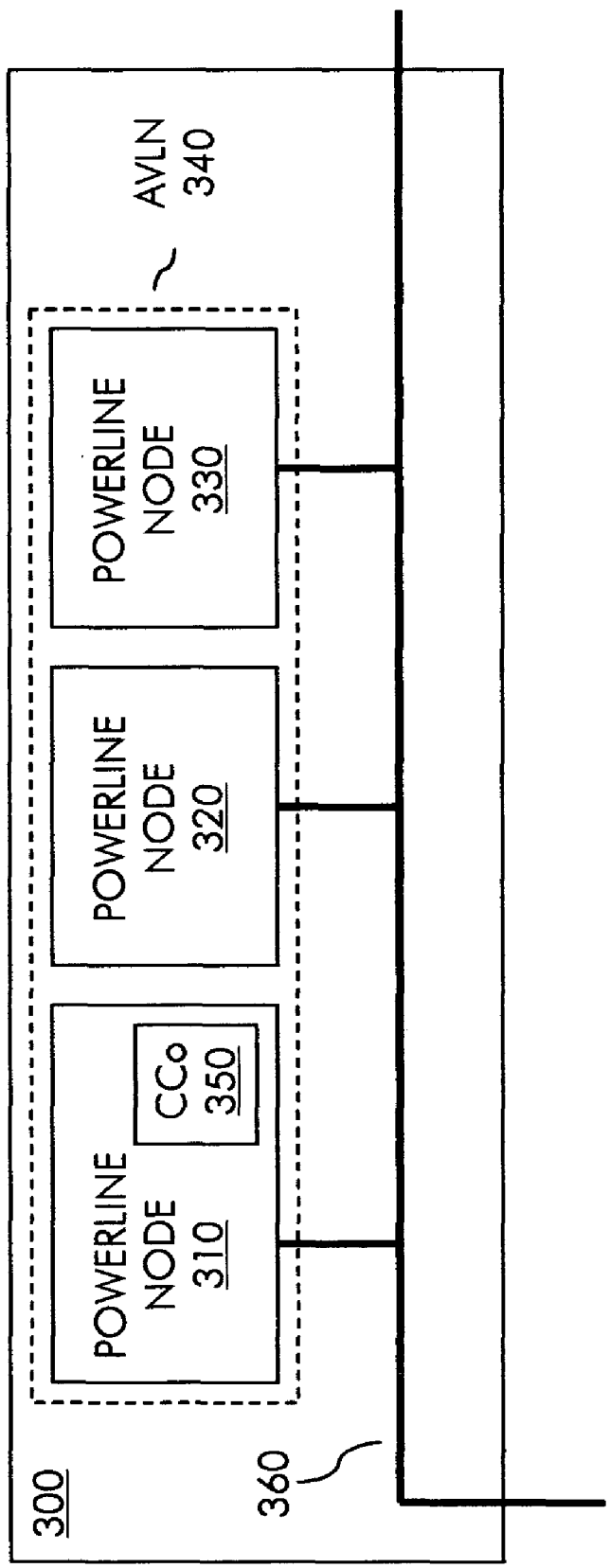
FIG. 3 shows an HPAV network in some embodiments of the invention.

FIG. 3 shows an HPAV network in some embodiments of the invention. The HPAV network is operative in a dwelling unit 300, such as a house, condominium or apartment. Dwelling unit 300 includes powerline nodes 310, 320, 330 that are members of an AVLN 340. Nodes 310, 320, 330 include a managing node 310 that has been designated CCo and has an active CCo entity 350, and managed nodes 320, 330. Nodes 310, 320, 330 are connected to an AC power line 360 that provides a channel for communication of video, audio and data content and control information in beacon periods that are synchronized to the AC line cycle, with each beacon period traversing two AC line cycles. Nodes 310, 320, 330 may include, by way of example, televisions, stereos, powered speakers, receivers, digital video disc (DVD) players, compact disc (CD) players, digital picture frames, home intercom systems, routers, switches, gateways, bridges, network attached storage, surveillance cameras, voice over Internet Protocol (VoIP) phones, personal computers (PC) and personal data assistants (PDA) that are HPAV compatible. Naturally, the number of nodes and AVLN is illustrative and may vary. Moreover, while an HPAV network is described, the invention has application to other types of powerline networks.

Figure 4:
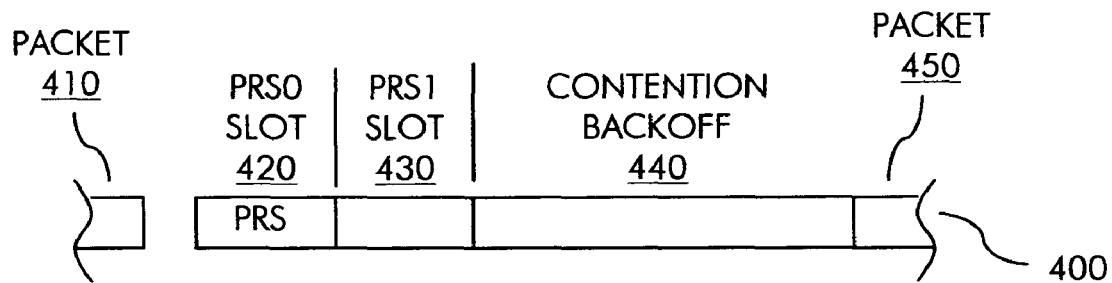
FIGS. 4-6 show segments of a shared CSMA region of an HPAV network in which an EPR mode is active in some embodiments of the invention.
Figure 5:
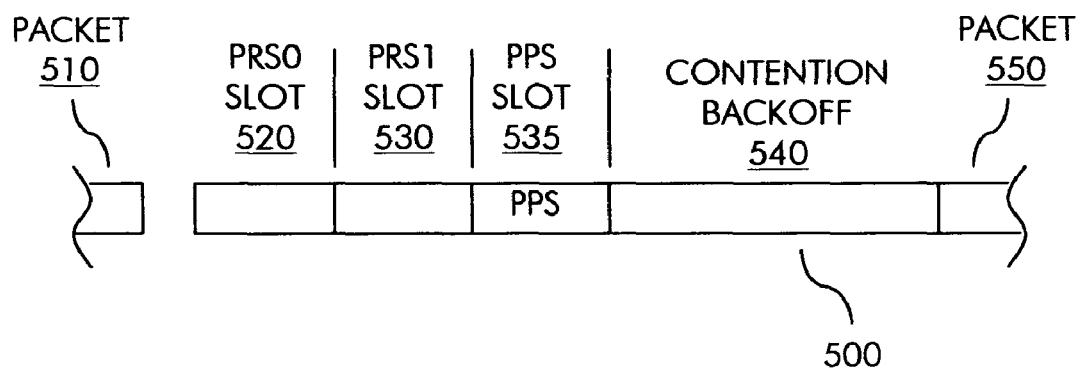
Figure 6:
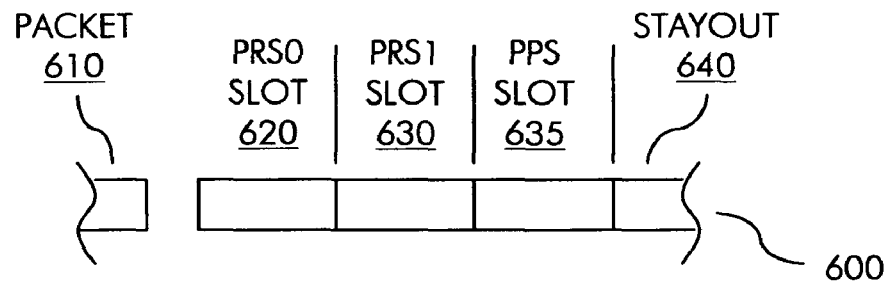

FIGS. 4-6 show segments of a shared CSMA region of an HPAV network in which an EPR mode is active in some embodiments of the invention. Turning first to FIG. 4, a shared CSMA region segment 400 begins after a packet 410 and an interframe space. Packet 410 may be a beacon at the end of a beacon region, in which case segment 400 is the initial segment of the shared CSMA region. Alternatively, packet 410 may be a packet transmitted in preceding segment of the shared CSMA region, in which case segment 400 is a second or subsequent segment of the shared CSMA region. In either event, segment 400 starts with a PRS0 slot 420 followed by a PRS1 slot 430 that are monitored by nodes 310, 320, 330 and together indicate the highest priority of a packet or packets on nodes 310, 320, 330 that await contention-based transmission. More particularly, ones of nodes 310, 320, 330 that have a packet or packets to transmit in the shared CSMA region transmit a PRS in one or both of PRS slots 420, 430 to indicate to other nodes 310, 320, 330 the priority of their respective packets. For example, if one or more of nodes 310, 320, 330 has a packet at the highest priority (CA3), the one or more of nodes 310, 320, 330 transmits a PRS in both of PRS slots 420, 430. If one or more of nodes 310, 320, 330 has a packet at the second highest priority (CA2), the one or more of nodes 310, 320, 330 transmits a PRS in PRS0 slot 420 but not in PRS1 slot 430. If one or more of nodes 310, 320, 330 has a packet at the third highest priority (CA1) and none of the other nodes 310, 320, 330 transmitted a PRS in PRS0 slot 420, the one or more of nodes 310, 320, 330 transmits a PRS in PRS1 slot 430 but not in PRS0 slot 420. Finally, if one or more of nodes 310, 320, 330 has a packet at the lowest priority (CA0) or does not have any packet, the one or more of nodes 310, 320, 330 does not transmit a PRS in either of PRS slots 420, 430. In the illustrated example, a PRS is transmitted in PRS0 slot 420 but not PRS1 slot 430, indicating that the highest priority packet pending on any of nodes 310, 320, 330 is at the second highest priority (CA2). As a result, PRS1 slot 430 is followed immediately by a contention backoff area 440 in which ones of nodes 310, 320, 330 that have a packet pending at the second highest priority (CA2) contend for the right to transmit their respective packets, and the winner transmits its packet 450 after the contention backoff area 440. Nodes 310, 320, 330 monitor channel 360 throughout.

As mentioned in conjunction with FIG. 4, monitoring of PRS slots alone does not enable nodes 310, 320, 330 to distinguish the case where one or more of nodes 310, 320, 330 has a packet pending at the lowest priority (CA0) from the case where none of nodes 310, 320, 330 has a packet pending at any priority. Providing nodes 310, 320, 330 with a means to differentiate these two situations is advantageous in that nodes 310, 320, 330 can suspend monitoring and conserve power if they can confirm that none of nodes 310, 320, 330 has a packet pending. To enable nodes 310, 320, 330 to discriminate between these two cases, a PPS slot is introduced when neither PRS slot includes a PRS.

FIG. 5 illustrates a case where a PPS slot 535 is introduced and indicates that one or more of nodes 310, 320, 330 has a packet pending at the lowest priority (CA0). A shared CSMA segment 500 starts after a packet 510 and an interframe space. Segment 500 begins with a PRS0 slot 520 followed by a PRS1 slot 530 that are monitored by nodes 310, 320, 330 and together indicate the highest priority packet or packets on nodes 310, 320, 330 that await contention-based transmission. In the illustrated example, a PRS is not transmitted in either PRS0 slot 520 or PRS1 slot 530, indicating either that the highest priority packet pending on any of nodes 310, 320, 330 is at the lowest priority (CA0) or that none of nodes 310, 320, 330 has a packet pending. To resolve this ambiguity, PPS slot 535 is introduced after PRS1 slot 530 and any of nodes 310, 320, 330 that has a packet pending at the lowest priority (CA0) indicates such by transmitting a PPS in PPS slot 535. In some embodiments, the PPS has a different structure than the PRS, for example, is an inverse or phase-shifted version of the PRS, although in other embodiments the PRS and PPS may have an identical structure. In the illustrated example, a PPS is transmitted in PPS slot 535 indicating that one or more of nodes 310, 320, 330 has a packet pending at the lowest priority (CA0). PPS slot 535 is therefore followed immediately by a contention backoff area 540 in which ones of nodes 310, 320, 330 that have a packet pending at the lowest priority (CA0) contend for the right to transmit their packets, and the winner transmits its packet 550. Nodes 310, 320, 330 monitor channel 360 throughout.

FIG. 6 illustrates a case where a PPS slot 635 is introduced and indicates that none of nodes 310, 320, 330 has a packet pending. A shared CSMA segment 600 starts after a packet 610 and an interframe space. Segment 600 begins with a PRS0 slot 620 followed by a PRS1 slot 630 that are monitored by nodes 310, 320, 330 and together indicate the highest priority packet or packets on nodes 310, 320, 330 that await contention-based transmission. In the illustrated example, a PRS is not transmitted in either PRS0 slot 620 or PRS1 slot 630, indicating either that the highest priority packet pending on any of nodes 310, 320, 330 is at the lowest priority (CA0) or that none of nodes 310, 320, 330 has a packet pending. To resolve the ambiguity, PPS slot 635 is introduced immediately after PRS1 slot 630 and any of nodes 310, 320, 330 that has a packet pending at the lowest priority (CA0) indicates such by transmitting a PPS in PPS slot 635. In the illustrated example, no PPS is transmitted in PPS slot 635, indicating that none of nodes 310, 320, 330 has a packet pending. Nodes 310, 320, 330 thus suspend monitoring for the rest of the shared CSMA region, and may enter a power conserving "sleep" mode.

Figure 7:
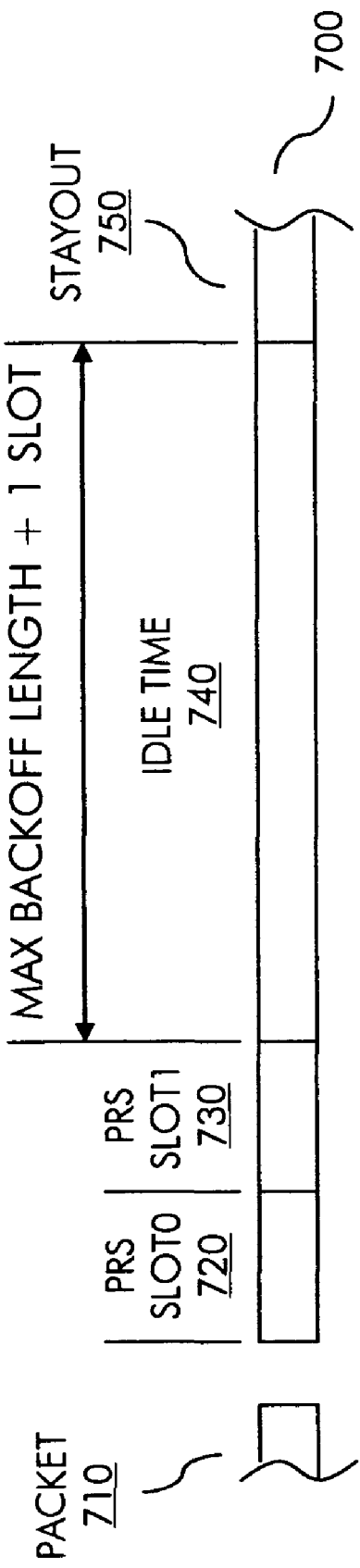
FIG. 7 shows a segment of a shared CSMA region of an HPAV network in which an EIS mode is active in some embodiments of the invention.

Turning now to FIG. 7 a segment 700 of a shared CSMA region of an HPAV network operating in an EIS mode is shown in some embodiments of the invention. Segment 700 begins after a packet 710 and an interframe space. Packet 710 may be a beacon at the end of a beacon region, in which case segment 700 is the initial segment of the shared CSMA region. Alternatively, packet 710 may be a packet transmitted in preceding segment of the shared CSMA region, in which case segment 700 is a second or subsequent segment of the shared CSMA region. In either event, segment 700 begins with a PRS0 slot 720 followed by a PRS1 slot 730 that are monitored by nodes 310, 320, 330 and together indicate the highest priority packet awaiting contention-based transmission on nodes 310, 320, 330. Nodes 310, 320, 330 monitor for a valid transmission a predetermined window that includes PRS slots 720, 730 and a maximum backoff length plus one slot. If a valid transmission is detected in the predetermined window, nodes 310, 320, 330 continue monitoring. However, if no valid transmission is detected, nodes 310, 320, 330 stop monitoring the shared CSMA region and may enter a "sleep" mode. In the illustrated example, a PRS is not transmitted in either PRS0 slot 720 or PRS1 slot 730, indicating either that the highest priority packet pending on any of nodes 310, 320, 330 is at the lowest priority (CA0) or that none of nodes 310, 320, 330 has a packet pending. To resolve the ambiguity, nodes 310, 320, 330 monitor a maximum backoff length plus one slot for a valid transmission, since any of nodes 310, 320, 330 that has a packet pending at the lowest priority will transmit within the maximum backoff length in an attempt to secure contention-based access for transmission of its packet. In the illustrated example, the maximum backoff length plus one slot passes as idle time 740, meaning that none of nodes 310, 320, 330 has a packet pending and nodes 310, 320, 330 discontinue monitoring the shared CSMA region and may enter a "sleep" mode.

Figure 8:
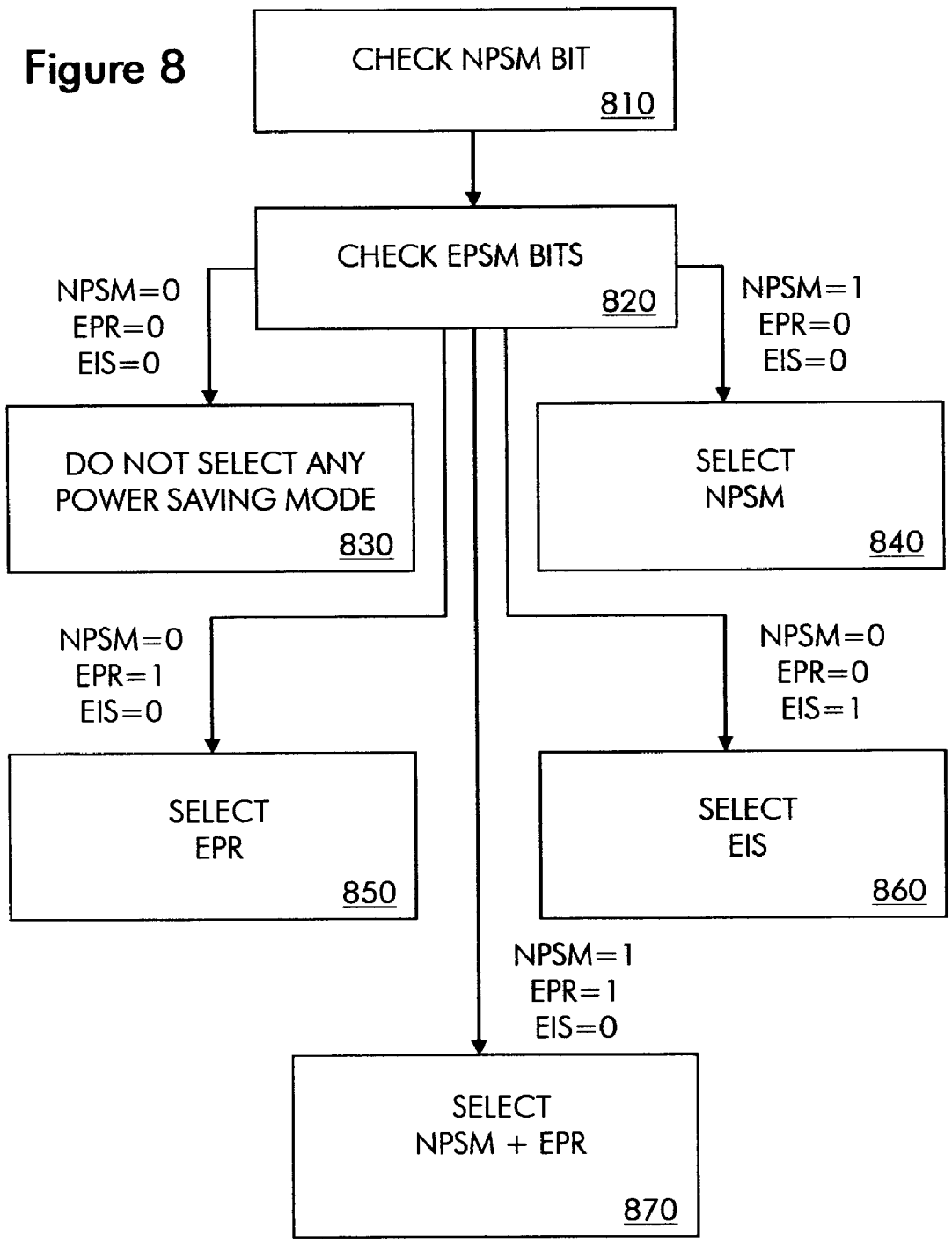
FIG. 8 shows an EPSM selection method performed by a managed node in some embodiments of the invention.

FIG. 8 shows an EPSM selection method performed individually by managed nodes in some embodiments of the invention. A managed node first checks the NPSM bit in the beacon region (810). In some embodiments, the NPSM bit is at bit four of octet eight of the beacon payload for the AVLN. The managed node then checks the EPSM bits in the beacon region for an EPSM indicator (820). In some embodiments, the EPSM bits include a EPR mode bit at bit four of octet 11 of the beacon payload for the AVLN and a EIS mode bit at bit five of octet 11 of the beacon payload for the AVLN. If none of these bits is set, the managed node does not select any power saving mode (830). The absence of a power saving mode may desirable if, for example, one or more nodes in an AVLN is running an application with a low data rate and low delay tolerance, such as voice over Internet Protocol (VoIP). If the NPSM bit is set but the EPR and EIS mode bits are not set, the managed node selects NPSM as the power saving mode (840). If the EPR mode bit is set but the NPSM bit and EIS mode bit are not set, managed node selects EPR as the power saving mode (850). If the EIS mode bit is set but the NPSM bit and EPR mode bit are not set, the managed node selects EIS as the power saving mode (860). Finally, if the NPSM bit and the EPR mode bit are set but the EIS mode bit is not set, the managed node selects NPSM and EPR as dual power saving modes that operate simultaneously (870). In some embodiments, the NPSM bit and the EPSM bits are set if they have a "1" value and are not set if they have a "0" value.

Figure 9:
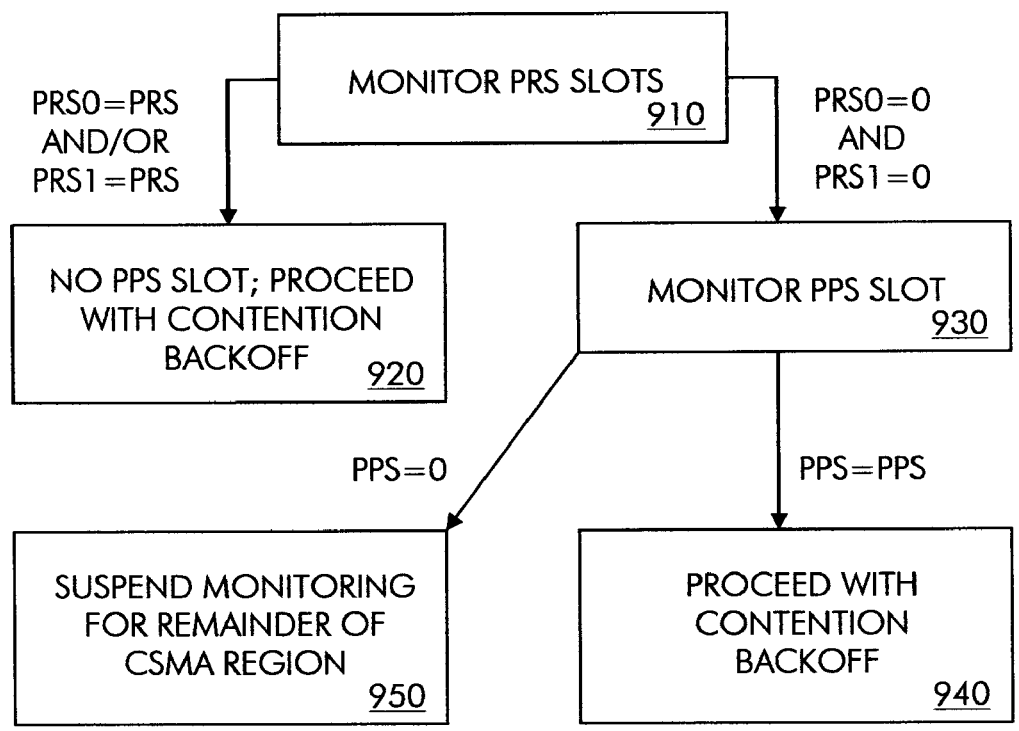
FIG. 9 shows an EPR enhanced power saving method performed by a managed node in some embodiments of the invention.

FIG. 9 shows an EPR enhanced power saving method performed individually by managed nodes in some embodiments of the invention. This method is performed by a managed node in the shared CSMA region in response to selecting EPR as a power saving mode. In the method, the managed node monitors the PRS slots (910). If the managed node detects a PRS in either of the PRS slots, the managed node determines that the shared CSMA region does not include a PPS slot and proceeds immediately to contention backoff (920). If, however, the managed node fails to detect a PRS in either of the PRS slots, the managed node monitors the inserted PPS slot (930). If the managed node detects a PPS in the PPS slot, the managed node determines that a node has a packet pending and proceeds to contention backoff (940). If, however, the managed node fails to detect a PPS in the PPS slot, the managed node determines that no node has a packet pending and suspends monitoring for the remainder of the shared CSMA region (950).

FIG. 10 shows an EIS enhanced power saving method performed individually by managed nodes in some embodiments of the invention. This method is performed by a managed node in the shared CSMA region in response to selecting EIS as the power saving mode. In the method, when the first PRS slot (i.e. PRS0 slot) arrives, the managed node begins idle sensing (1010). If the managed node fails to detect a valid transmission in a predetermined window that includes the PRS slots and a maximum contention backoff length plus one slot, the managed node suspends monitoring for the remainder of the shared CSMA region (1020). If, however, the managed node detects a valid transmission within the predetermined window, the managed node terminates idle sensing and continues monitoring (1030).

FIG. 11 shows a method performed by a managing node to dynamically adapt a beacon period in some embodiments of the invention. A managing node detects that the channel is idle and starts a timer (1110). If the timer reaches a limit time before the managing node detects a valid non-beacon transmission, the managing node stops the timer and reduces the transmission frequency of the beacon period by half (1120), subject to a minimum frequency that the transmission frequency cannot fall below (1130). If, however, the managing node detects a valid non-beacon transmission before the timer reaches a limit time, the managing node stops the timer and increases the transmission frequency of the beacon period to a maximum transmission frequency (e.g. two AC cycles) (1140). The managing node informs managed nodes within its AVLN of adjustments to the transmission frequency, for example, in the beacon slot for the AVLN within the beacon region, wherein the managed nodes monitor and detect the adjustments to the transmission frequency.

Operations described herein as being performed by nodes may be carried out using custom logic, a general purpose processor, or some combination thereof. It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come with in the meaning and range of equivalents thereof are intended to be embraced therein.

What is claimed is:

1. An enhanced power saving method for a powerline network, comprising the steps of:
   detecting an enhanced power saving mode (EPSM) indicator in a beacon region of a beacon period; and
   selecting an EPSM from among a plurality of EPSM based on the EPSM indicator, wherein the plurality of EPSM comprise an enhanced priority resolution (EPR) mode and an enhanced idle sensing (EIS) mode.

2. The method of claim 1, wherein the EPR mode is selected, a packet presence symbol (PPS) slot in a shared carrier sense multiple access (CSMA) region of the beacon period is monitored in response to a failure to detect a priority resolution symbol (PRS) in any of a plurality of monitored PRS slots in the shared CSMA region, and monitoring in the shared CSMA region after the PPS slot is conditioned on whether a PPS is detected in the PPS slot.

3. The method of claim 1, wherein the EIS mode is selected, a predetermined window starting with a PRS slot and ending after a maximum contention backoff length in a shared CSMA region is monitored for a valid transmission, and monitoring in the shared CSMA region after the predetermined window is conditioned on whether a valid transmission is detected.

4. The method of claim 1, wherein detecting the EPSM indicator comprises detecting an EPR mode bit in a beacon payload.

5. The method of claim 1, wherein detecting the EPSM indicator comprises detecting an EIS mode bit in a beacon payload.

6. The method of claim 1, wherein the method is performed by a managed node of a HomePlug AV (HPAV) network.

7. The method of claim 1, further comprising the step of detecting a reduction in a beacon period transmission frequency, wherein the beacon period transmission frequency is reduced in response to a failure to detect a valid non-beacon transmission within a limit time.

8. An enhanced power saving method for a powerline network, comprising the steps of:
   monitoring a plurality of PRS slots in a shared CSMA region of a beacon period;
   monitoring a PPS slot in the shared CSMA region in response to a failure to detect a PRS in any of the plurality of PRS slots; and
   conditioning monitoring in the shared CSMA region after the PPS slot on whether a PPS is detected in the PPS slot.

9. The method of claim 8, wherein the conditioning monitoring step comprises continuing monitoring in response to detecting a PPS in the PPS slot.

10. The method of claim 8, wherein the conditioning monitoring step comprises suspending monitoring in response to a failure to detect a PPS in the PPS slot.

11. The method of claim 8, wherein the method is performed by a managed node of a HPAV network.

12. The method of claim 8, further comprising the step of detecting a reduction in a beacon period transmission frequency, wherein the beacon period transmission frequency is reduced in response to a failure to detect a valid non-beacon transmission within a limit time.

13. An enhanced power saving method for a powerline network, comprising the steps of:
   monitoring for a valid transmission a predetermined window starting with a PRS slot and ending after a maximum contention backoff length in a shared CSMA region of a beacon period; and
   conditioning monitoring in the shared CSMA region after the predetermined window on whether a valid transmission is detected.

14. The method of claim 13, wherein the conditioning monitoring step comprises continuing monitoring in response to detecting a valid transmission.

15. The method of claim 13, wherein the conditioning monitoring step comprises suspending monitoring in response to a failure to detect a valid transmission.

16. The method of claim 13, wherein the predetermined window ends one slot after the maximum contention backoff length.

17. The method of claim 13, wherein the method is performed by a managed node of a HPAV network.

18. The method of claim 13, further comprising the step of detecting a reduction in a beacon period transmission frequency, wherein the beacon period transmission frequency is reduced in response to a failure to detect a valid non-beacon transmission within a limit time.

* * * * *